United States Patent Office 3,261,678
Patented July 19, 1966

3,261,678
METHOD FOR INHIBITING PLANT GROWTH
Norman E. Searle, Wilmington, Del., assignor to E. I. du Pont de Nemours and Company, Wilmington, Del., a corporation of Delaware
No Drawing. Filed Jan. 27, 1964, Ser. No. 340,524
3 Claims. (Cl. 71—2.6)

This application is a continuation-in-part of my application Serial No. 106,536, filed May 1, 1961, now abandoned, which is a continuation-in-part of my application Serial No. 812,085, filed May 11, 1959 (now abandoned), which, in turn, is a continuation-in-part of application Serial No. 620,997, filed November 8, 1956, and now abandoned.

This invention relates to novel 2,3,6-trichlorobenzoyl halides and to compositions and methods for using them as herbicides.

The benzoyl chloride is prepared by the reaction of 2,3,6-trichlorobenzoic acid with thionyl chloride, phosphorus trichloride or tribromide, or phosphorous pentachloride, according to the following equations:

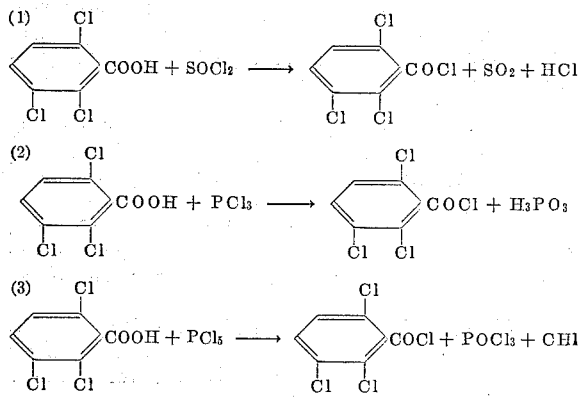

The preparation of 2,3,6-trichlorobenzoic acid is disclosed in Brimelow, Jones, JCS, Part II, page 1211 (1951), and Rec. Trav. Chim. 21, 383 (1902).

The thionyl chloride method of Equation 1 is preferred. In this method, 4 to 6 molar equivalents of thionyl chloride are used for each molar equivalent of substituted benzoic acid. Since it is present in excess, the thionyl chloride acts as a solvent for the reaction. Other inert solvents such as xylene, or toluene can be used, but give lower yields.

The mixture of thionyl chloride and substituted benzoic acid is heated to reflux until the evolution of gaseous HCl and $SO_2$ ceases; this usually takes about 4 hours. Excess thionyl chloride is removed by distillation. The substituted benzoyl chloride product is obtained by further distillation under reduced pressure.

The $PCl_5$ method of Equation 3 is run by mixing approximately equimolar proportions of $PCl_5$ and the substituted benzoic acid. After the initial reaction has subsided, the mixture is heated on a steam bath until the evolution of HCl ceases. Phosphorous oxychloride is removed from the mixture by evaporation under reduced pressure at steam bath temperature. The residue is distilled at reduced pressure to give pure substituted benzoyl chloride product.

The $PCl_3$ method of preparation (Equation 2) is run in the same manner as the $PCl_5$ method. Equimolar proportions of substituted benzoic acid and $PCl_3$ are used. The $H_3PO_3$ is washed from the crude reaction product with water and the residue is then distilled to obtain the pure substituted benzoyl chloride.

In all methods, after the removal of the HCl and excess halide, the resulting product is sufficiently pure to be used directly as a herbicide.

The benzoyl iodide and bromide can be prepared by the method of Standinger and Anthes, set forth in Ber., 46, 1417 (1913). According to this method, the benzoyl chloride is saturated with about three times the necessary amount of dry hydrogen bromide or iodide. Subsequent distillation gives the corresponding 2,3,6-trichlorobenzoyl iodide or bromide.

The benzoyl fluoride can be prepared by distilling the benzoyl chloride with zinc fluoride.

The compounds of this invention are outstanding herbicides and can be used to control such broadleaf and grassy annual and perennial weeds as crabgrass, yellow foxtail, Johnson grass, barnyard grass, giant foxtail, wild mustard, dandelion, Amaranthus, and lamb's-quarters. They are also effective in controlling perennial woody vines such as Virginia creeper, honeysuckle and trumpet vine. The compounds are also highly effective as soil sterilants and when used properly, can render soil free of vegetation for prolonged periods.

I have also discovered that 2,3,6-trichlorobenzoyl chloride controls the growth of axillary buds commonly called "suckers" on topped tobacco plants.

The 2,3,6-trichlorobenzoyl halides have low volatility characteristics as contrasted to the corresponding free benzoic acid. This reduces the volatility problem encountered when hormonal-type herbicides are applied in proximity to sensitive crops.

In order that the compounds of this invention be used to their best advantage as herbicides, they should be formulated with pest-control adjuvants. Such adjuvants and methods for formulating active herbicidal ingredients with them are disclosed in U.S. Patents Nos. 2,655,444–447; 2,843,470; 2,849,306; 2,854,325; 2,895,817; and the patents cited therein. The portions of these patents which disclose such adjuvants and methods are hereby incorporated into this application by reference.

The 2,3,6-trichlorobenzoyl halides should be present in such compositions at concentrations of from 0.5% to 95%. The exact amount will depend on the composition's intended use, and can be easily determined by one skilled in the art.

The compositions thus formulated must naturally be applied in amounts sufficient to exert the desired herbicidal action. The precise amount applied in any instance will, of course, depend on such factors as climate, the type of soil to be treated, the type of plant to be treated and the stage of its growth and the like. Generally, however, application of a composition in an amount sufficient to provide from 1.5 to 60 pounds of 2,3,6-trichlorobenzoyl halide per acre will give satisfactory results.

Tobacco plants are generally topped when they are 90% in flower. Topping at other times is generally not as effective in accomplishing the desired results, namely providing the tobacco leaf with nutrients that ordinarily would be wasted. I have found that in order to control axillary bud growth ¼ to 8 pounds per acre of 2,3,6-trichlorobenzoyl chloride can be applied to tobacco plants at any time within the period of two days before to two days after topping. The 2,3,6-trichlorobenzoyl chloride can be best applied to the tobacco plants as a foliar spray in sufficient volume of water to give uniform distribution.

The following examples are presented so that this invention may be more easily understood and more readily practiced.

*Example 1*

A total of 225.5 parts by weight of 2,3,6-trichlorobenzoic acid is combined with 500 parts by weight of thionyl chloride. This mixture is heated at reflux temperature under anhydrous conditions until hydrogen chloride and sulfur dioxide cease to evolve from the reaction. Excess thionyl chloride is removed by distillation and further distillation of the residue under reduced pressure yields 210 parts by weight of essentially pure 2,3,6-trichlorobenzoyl chloride boiling at 85–887° C. at 0.8 mm. pressure, $n_D{}^{25}=1.5772$.

This compound is formulated into the following herbicidal composition by blending the listed ingredients together in a ribbon blender, then micropulverizing until the particles are under 50 microns in diameter:

| | Percent |
|---|---|
| Active | 25 |
| Polyoxyethylene esters of mixed fatty and resin acids | 2 |
| Attapulgite clay | 73 |

This composition is then extended with water to give a sprayable formulation containing 1% by weight of the active ingredient. When applied at a dosage of 60 pounds of active ingredient per acre to an area infested with crabgrass, yellow foxtail, Johnson grass, trumpet vine, honeysuckle, ragweed and dandelion, excellent weed control is obtained.

Example 2

A total of 225.5 parts by weight of dry 2,3,6-trichlorobenzoic acid is mixed with 208.5 parts of powdered phosphorous pentachloride. After the initial reaction has subsided, the mixture is heated on a steam bath for about an hour. The phosphorous oxychloride is then removed by evaporation on a steam bath, using a water pump. The residue is essentially pure 2,3,6-trichlorobenzoyl chloride.

The benzoyl chloride is prepared as an emulsifiable oil according to the following formula:

| | Percent |
|---|---|
| 2,3,6-trichlorobenzoyl chloride | 30 |
| Blend of polyoxyalcohol carboxylic esters and oil soluble sulfonates | 5 |
| Xylene | 65 |

This formulation is applied in 100 gallons of water at 10 to 20 pounds of active ingredient per acre for the control of bindweed, Russian knapweed, honeysuckle and wild mustard.

Example 3

Phosphorous trichloride (137.5 parts by weight) is gradually added to 225.5 parts of 2,3,6-trichlorobenzoic acid and the mixture is heated until hydrogen chloride evolution stops. The phosphoric acid is removed from the reaction mixture by cooling and diluting the mixture with water. The residual oil is separated, dried over anhydrous magnesium sulfate, and filtered to give essentially pure 2,3,6-trichlorobenzoyl chloride.

Granules containing 15% of this benzoyl chloride are prepared by spraying it upon granular expanded vermiculite. These granules are easily applied by hand as a "spot treatment" for the control of brush and woody vines. Rates of from 5 to 20 pounds of active ingredient per acre give effective control of mixed infestations of black locust, Virginia creeper and honeysuckle.

Example 4

Two hundred and forty-four parts by weight of 2,3,6-trichlorobenzoyl chloride are treated with dry hydrobromic acid gas at room temperature until the total weight of the reaction mixture is approximately 450 parts by weight. This mixture is warmed on a steam bath for two hours.

The mixture is then evaporated over a steam bath under vacuum. The resulting residue is essentially pure 2,3,6-trichlorobenzoyl bromide.

2,3,6-trichlorobenzoyl iodide is prepared in a similar fashion by treating 244 parts of 2,3,6-trichlorobenzoyl chloride with dry hydroiodic acid gas until the total weight of the reaction mixture is approximately 590 parts by weight.

Example 5

Dehydrated zinc fluoride (103.4 gms.) and 2,3,6-trichlorobenzoyl chloride are heated for 8 hours over a steam bath. The resulting mixture is distilled at reduced pressure to give essentially pure 2,3,6-trichlorobenzoyl fluoride.

The benzoyl halides produced according to Examples 4 and 5 can be formulated into herbicidal compositions in the manner described in Examples 1, 2 and 3.

Example 6

Sixty gallons is prepared of an emulsifiable concentrate containing water and two pounds of 2,3,6-trichlorobenzoyl chloride. This concentrate is sprayed on one acre of topped tobacco. Application is made three hours after topping. About 90% of the tobacco plants are in flower.

The treatment causes almost complete suppression of sucker growth. A good yield is produced of quality tobacco leaves.

The invention claimed is:

1. A method for inhibiting the growth of plants, said method comprising applying a plant growth inhibiting amount of 2,3,6-trichlorobenzoyl halide to the area to be protected.

2. A method for the control and destruction of weeds, said method comprising applying a herbicidally effective amount of 2,3,6-trichlorobenzoyl chloride to the area to be protected.

3. A method for the control and destruction of weeds, said method comprising applying a herbicidally effective amount of 2,3,6-trichlorobenzoyl bromide to the area to be protected.

References Cited by the Examiner

UNITED STATES PATENTS

| | | | |
|---|---|---|---|
| 2,394,916 | 2/1946 | Jones | 71—2.6 |
| 2,726,947 | 12/1955 | Baumgartner | 71—2.6 |
| 3,014,063 | 12/1961 | McLane et al. | 71—2.6 X |
| 3,014,965 | 12/1961 | Newcomer et al. | 71—2.6 X |
| 3,156,553 | 11/1964 | Searle | 71—2.6 |
| 3,202,708 | 8/1965 | Gujovich | 71—2.6 X |

OTHER REFERENCES

Jones: Biochemical Journal, vol. 48, pages 422 to 425 (1951).

Thompson et al.: Botanical Gazatte, vol. 107 (1946), pages 475 to 507 (pages 489, 493 and 495 particularly pertinent).

Plant Regulators, CBCC Positive Data Series, No. 2, June 1955, Publication 384, pages a, b, c, 1 and 22.

LEWIS GOTTS, *Primary Examiner.*

J. O. THOMAS, *Assistant Examiner.*